May 7, 1946.　　　A. B. WELTY　　　2,399,774
HARVESTER
Filed Oct. 30, 1942　　　3 Sheets-Sheet 1
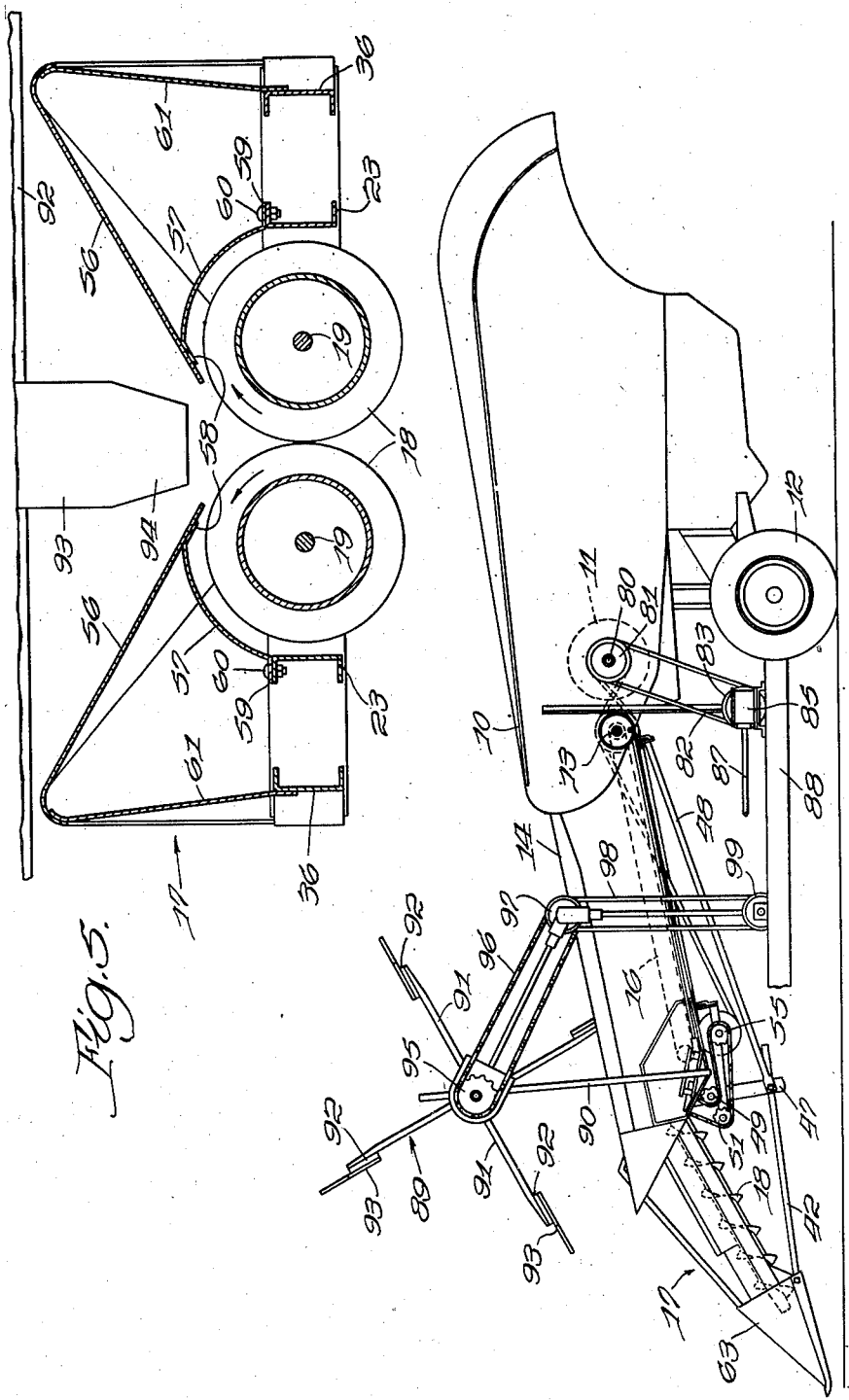

May 7, 1946.  A. B. WELTY  2,399,774
HARVESTER
Filed Oct. 30, 1942  3 Sheets-Sheet 2
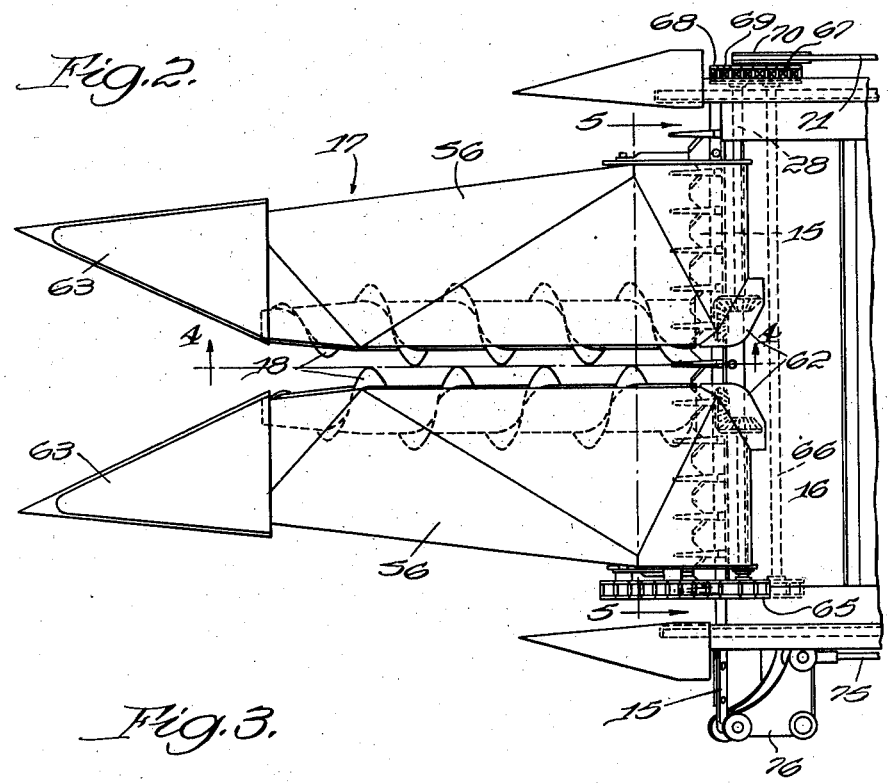
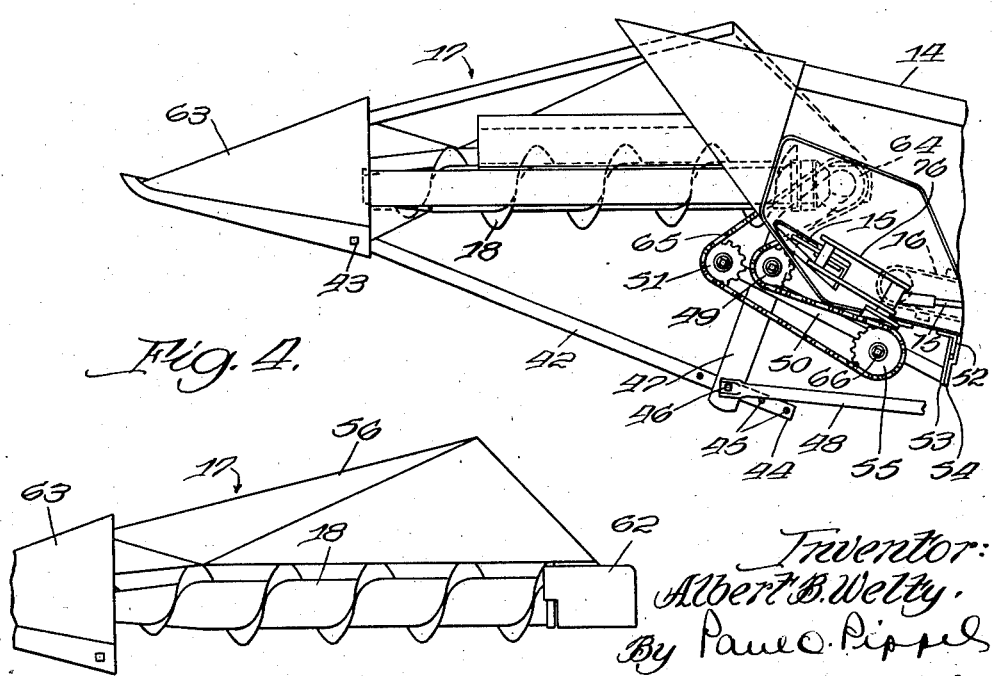

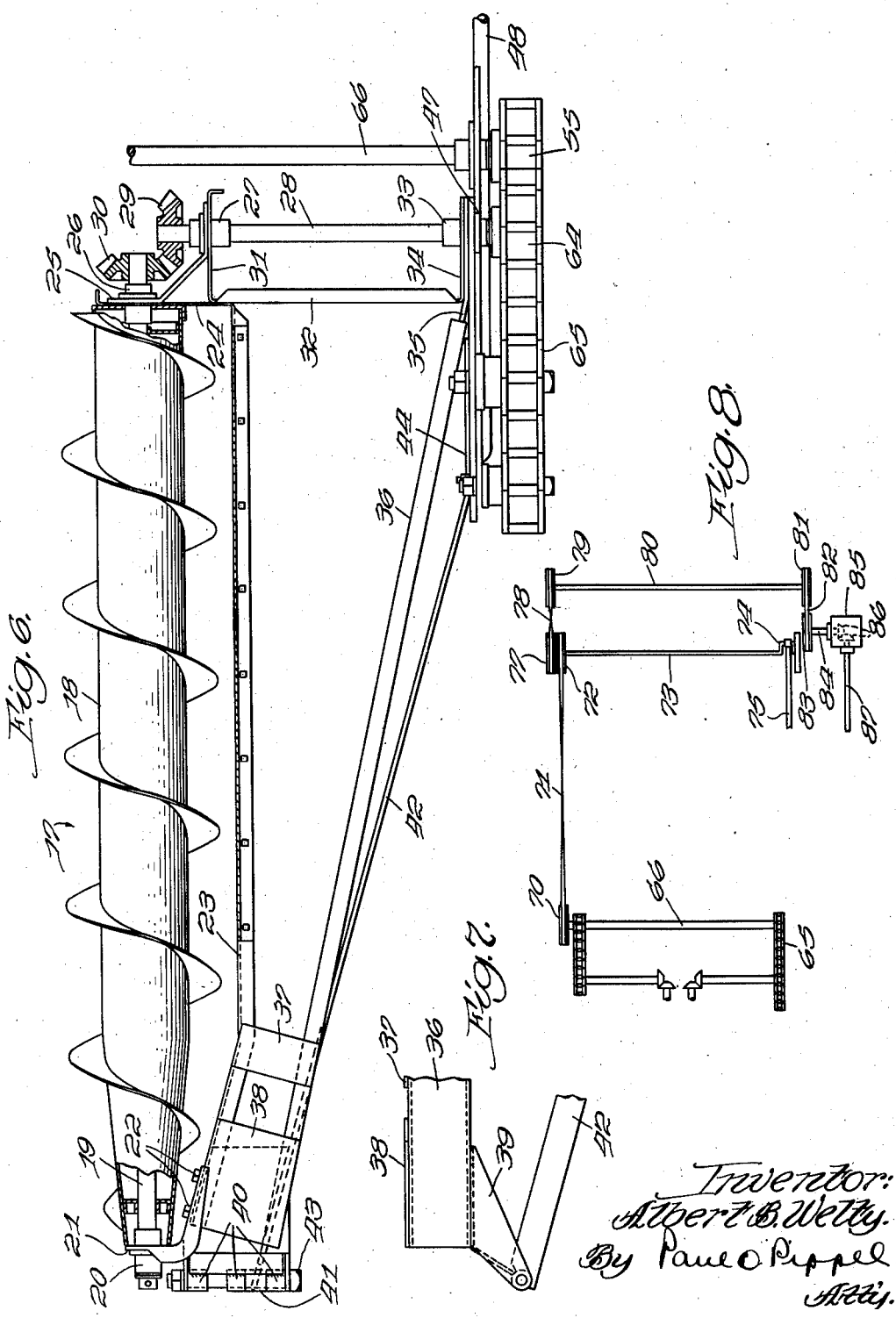

Patented May 7, 1946

2,399,774

UNITED STATES PATENT OFFICE 2,399,774

HARVESTER

Albert B. Welty, Moline, Ill., assignor to International Harvester Company, a corporation of New Jersey Application October 30, 1942, Serial No. 463,961

4 Claims. (Cl. 56—95)

This invention relates to a harvester. More specifically it relates to a corn cutter.

Some difficulty has been encountered with corn cutters, because pendant ears upon corn stalks require the cutting of the stalks at a low level in order that the pendant ears may not be engaged by the cutter. The lower portions of the stalks may be difficult to cut because they are thick and fibrous. Any attempt to cut at a higher level where the stalks are easier to cut may result in damage to the ears by the cutter. The arrangement of the present invention has to do with cutting the corn stalks at a high level without interference between the pendant ears and the cutter.

An object of the present invention is to provide an improved harvester.

A further object is the provision of an improved stalk cutter.

Another object is to provide an improved gathering means for guiding stalks of a stalk cutter.

Other objects will appear from the disclosure.

According to the present invention, a pair of auger feed elements extends forwardly from a stalk cutter. These elements are rotated so that their adjacent portions move upwardly and thus tend to lift pendant ears as the stalks pass between them to the cutter. Since the pendant ears are lifted, the stalks may be cut at a higher level without contact between the ears and the cutter.

In the drawings:

Figure 1 is a side view showing the improved gathering means of the present invention attached to a harvester thresher;

Figure 2 is a plan view of the improved gathering means and the forward end of the harvester thresher to which the gathering means is attached;

Figure 3 is a side view of what is shown in Figure 2;

Figure 4 is a side view of a portion of the gathering means, as indicated by the lines 4—4 of Figure 2;

Figure 5 is a sectional view taken along the lines 5—5 of Figure 2;

Figure 6 is a plan view of a portion of the novel gathering means with certain parts removed;

Figure 7 is a detail view showing a portion of the gathering means; and

Figure 8 is a schematic view showing drive of the harvester thresher and the novel gathering means attached thereto.

Reference character 10 designates a thresher body which houses a thresher cylinder 11. The thresher body 10 is supported upon a transverse axle, not shown, at the ends of which are supporting wheels of which only one wheel 12 is shown. Pivotally secured to the forward end of the thresher body 10 at 13 is a platform 14 of the same width as the thresher body 10 and extending forwardly therefrom. The platform carries at its forward end a reciprocating cutter 15 and a conveyer 16 extending between the cutter 15 and the cylinder 11. As indicated in Figure 1, the platform 14 is held in somewhat raised position, and to the forward end thereof is secured a gathering means or guiding means, indicated by the reference character 17. This means comprises essentially a pair of auger feed elements 18 extending forwardly from the middle of the front of the platform 14 in adjacent and somewhat spaced relationship. As seen in Figure 6, each auger feed element 18 includes a shaft 19, the front end of which is journaled in a bearing 20 secured to a bracket 21. The bracket 21 is secured by bolts 22 to a channel member 23, which extends along the auger feed element 18 to the upper end thereof. The upper end of the channel 23 has a transverse portion 24. Secured to the transverse portion 24 and to a bracket 25 is a bearing 26 in which is rotatably supported the upper end of the shaft 19 of the auger feed element 18. Also secured to the bracket 25 is a bearing 27, which journals a transverse drive shaft 28. Bevel gears 29 and 30, secured respectively to the drive shaft 28 and to the shaft 19 of the auger feed element 18, transmit drive from the shaft 28 to the auger feed element 18. The bearing 27 is secured not only to the bracket 25 but also to a transverse portion 31 of a channel 32 secured by soldering or welding to the transverse portion 24 of the channel 23. The transverse drive shaft 28 is journaled at one end in bearing 27 and at the other end in bearing 33 secured to a transverse portion 34 of the channel 32 and to a piece 35 secured to a channel 36. The channel 36 extends forwardly to adjacent the forward end of the auger feed element 18 in spaced relation to the forward end of the channel 23. The forward ends of the channels 23 and 26 are secured to one another by plates 37 and 38. Secured to the under-side of the forward ends of the channels 23 and 36 is a bracket 39, which has spaced tubular portions 40. Between two of the tubular portions 40 is positioned a tubular portion 41 upon the forward end of a brace member 42. A bolt 43 extends through the tubular portions 40 and 41 to hold the tubular portion 41 in place between the portions 40. The brace member 42 extends rearwardly generally along the auger feed element 18 and has an end portion 44 extending at a slight angle to the remainder of the brace member 42. The end portion 44 carries a plurality of holes 45, through one of which extends a bolt 46 to secure a vertical member 47 to the brace member 42 and also a brace 48 extending rearwardly beneath the side of the platform 14 and being attached beneath the rearward end thereof. The upper end of the vertical member 47 receives the transverse drive shaft 28. Upon an intermediate portion of the vertical member 47 is mounted a sprocket 49. Immediately below the sprocket 49 is secured a member 50, upon the forward end of which is journaled a sprocket 51. The rear end of the member 50 is secured beneath the platform 14 by an angle member 52 and members 53 and 54. The member 50 also supports a sprocket 55.

As seen in Figure 5, there are positioned generally over both auger feed elements 18 sheets 56, which slope downwardly from points spaced downwardly of the auger feed elements to points adjacent the inner sides of the auger feed elements but leave a portion of these elements exposed. The inner sides of the sheets 56 are supported over the auger feed elements 18 by curved members 57, which have flanged portions 58 secured to the sheets, as by soldering or welding, and have flanged portions 59 secured to the channels 23 by bolts 60. The outer sides of the sheets 56 are supported by straps 61, which are secured at their lower ends, as by soldering or welding, to the channels 36 and at their upper ends, as by soldering or welding, to the inside of the rear ends of the sheets 56. Shields 62 extend about the bevel gears 29 and 30. Divider points 63 are positioned adjacent the forward ends of the auger feed elements 18 upon the bolts 43.

As previously stated, each auger feed element 18 is driven by the transverse shaft 28 through the bevel gears 29 and 30. The outer end of the transverse drive shaft 28 carries a sprocket 64 which is engaged by a sprocket chain 65. As indicated in Figure 3, the sprockets 49 and 51 engage the chain 65 as idlers and guide the chain 65 over the reciprocating cutter 15 and therebeneath to the sprocket 55. The sprocket 55, shown in Figures 3 and 6, is secured to a transverse shaft 66 extending beneath the entire width of the platform 14. At the right side of the platform, as seen in Figure 2, there is secured to the shaft 66 a sprocket 67, which is engaged by a sprocket chain 68, in turn engaging a sprocket 69 secured to the transverse drive shaft 28 at the right side of the platform 14. The drive of the entire machine is illustrated schematically in Figure 8, and from this it will be seen that the right end of the transverse shaft 66 carries a pulley 70 engaged by a belt 71, which in turn engages a pulley 72 secured to a shaft 73. The shaft 73 is coincident with the pivot of the platform 14 upon the thresher body 10 previously identified by the reference character 13 and also carries means, not shown, serving to drive the platform conveyer 16. At the left end of the shaft 73 is a crank portion 74 to which is connected a connecting rod 75, which is in turn connected to a bell-crank 76, indicated in Figure 2, which in turn is connected to the reciprocating cutter 15. To the right end of the shaft 73 is secured a pulley 77 engaged by a belt 78 engaging in turn a pulley 79 secured to a shaft 80, upon which is secured the cylinder 11. To the left end of the shaft 80 is secured a pulley 81 engaged by a belt 82, in turn engaging a pulley 83 secured to a jack-shaft 84. The jack-shaft 84 extends into a gear box 85 and is in driving engagement by means of bevel gears 86 with a longitudinally extending shaft 87, which may be driven by a source of power such as a tractor, not shown, which will serve also to pull the entire machine. As indicated in Figure 1, the gear box 85 is mounted upon a longitudinally extending draw-frame 88 positioned between the wheel 12 and the thresher body 10. The draw-frame serves to connect the machine with the previously mentioned tractor, not shown.

Positioned over the harvester platform 14 is a reel 89 supported upon a vertical member 90 secured to the left side of the harvester platform 14. The reel 89 carries usual arms 91 to which are secured the usual transversely extending bats 92, which, as shown in Figure 5, will extend transversely across the width of the gathering means 17. It will be observed from this figure that there is secured to the reel bat 92 a member 93, which extends radially outwardly into the space between the sheets 56, and has an end portion 94 of decreasing width in adjacency with the exposed portions between the sheets 56 of the auger feed elements 18.

During operation the machine is drawn through a field containing rows of corn stalks by the previously mentioned tractor, not shown, so that a row of stalks passes between the auger feed elements 18. As indicated by the arrows upon the auger feed elements 18 in Figure 5, these elements are rotated in opposite directions so that their adjacent portions move upwardly. Thus as the stalks pass between the auger feed elements 18 and are fed rearwardly toward the reciprocating cutter 15, the rotation of the auger feed elements is such as to lift pendant ears and to cause them to ride upon the sheets 56. The reel bats 92 and members 93 thereon insure positive movement of the stalks against the reciprocating cutter 15. Since the rotating auger feed elements 18 serve in cooperation with the sheets 56 to lift pendant ears upon the stalks and to hold them somewhat raised, the tendency that the ears will come in contact with the cutter with resultant loss due to shelling is considerably lessened or completely avoided. Thus since the ears are raised, the cutter 15 may cut the stalks at a higher point than it might if the ears were not raised. Since the higher portions of the stalks are not as tough and consequently are easier to cut, the work of cutting is considerably lessened, and the very tough portions of the lower parts of the stalks which might resist cutting altogether are avoided. Also, since the stalks have less of the thick portions, less power is required to pass them through the cylinder.

The reel 89 is driven by a sprocket 95 driven in turn by a sprocket chain 96, which is in turn driven by a sprocket, not shown, mounted at the left side of the platform 14. This latter sprocket is driven by a pulley 97 secured thereto, which is in turn driven by a belt 98 driven by a pulley 99 mounted upon the draw-frame 88. There is a driving means, not shown, connecting the pulley 99 and the jack-shaft 94. The gathering means 17 may be raised and lowered with respect to the harvester platform 14 and shifting of the bolt 46, as shown in Figure 3, from one hole 45 in the brace member 42 to another hole 45 therein. Obviously, there are brace members as 42 at each side of the machine, and there must be shifting of each of these members.

It will be apparent from the foregoing description that there has been provided a novel gathering means for a stalk cutter. This gathering means comprises essentially a pair of rotating elements between which stalks move to a cutter bar. The essential feature of these rotating elements is that they cause pendant ears or pendant crops upon the stalks to be lifted, and thus the stalks may be cut at higher points without interference between the pendant ears or crops and the stalk-cutting means.

The intention is to limit the invention only within the scope of the appended claims.

What is claimed is:

1. In combination, a frame, a stalk cutter for standing stalks having pendant ears thereon, means mounting the stalk cutter on the frame, a pair of closely adjacent spiral feed elements extending from points closely adjacent the stalk cutter in side-by-side relation so as to form a throat for feeding standing stalks to the stalk cutter, means rotatably mounting the spiral feed elements upon the framework, and means rotating one element in one direction and the other element in the opposite direction so as to cause adjacent sides of the elements to move upwardly and thereby to raise the pendant ears on the stalks out of the way of the stalk cutter.

2. In combination, a frame, a stalk cutter for standing stalks having pendant ears thereon, means mounting the stalk cutter on the frame, means forming a throat for standing stalks leading to the stalk cutter and including a pair of closely adjacent rotatable means positioned to engage and provided with means to lift pendant ears on the stalks out of the way of the stalk cutter, and means mounting the throat-forming means on the frame.

3. In combination, a frame, a stalk cutter for standing stalks having pendant ears thereon, means mounting the stalk cutter on the frame, means forming a throat for standing stalks leading to the stalk cutter and including a pair of closely adjacent rotatable elements having stalk-advancing and ear-lifting means thereon at the sides of the throat and extending the length thereof, means mounting the throat-forming means upon the frame, and means for rotating one element in one direction and the other element in the other direction so as to cause adjacent sides of the elements to move upwardly and thereby to raise the pendant ears on the stalks out of the way of the cutter.

4. In a machine comprising a frame, stalk receiving means mounted on the frame, a conveyer positioned in front of said means for delivering stalks thereto, means mounting the conveyer on the frame, a cutter positioned in front of the conveyer for standing stalks having pendant ears thereon, and means mounting the cutter upon the frame, the combination therewith, of a pair of closely adjacent spiral feed elements extending forwardly from closely adjacent and above the cutter so as to form a throat for feeding standing stalks to the cutter, means mounting the spiral feed elements upon the frame, and means for rotating one element in one direction and the other element in the other direction so as to cause adjacent sides of the elements to move upwardly and thereby raise the pendant ears on the stalks out of the way of the cutter.

ALBERT B. WELTY.